United States Patent [19]
Younessian

[11] Patent Number: 5,376,322
[45] Date of Patent: Dec. 27, 1994

[54] PROCESS FOR MAKING A THERMOFORMED SHELL FOR A LUGGAGE CASE

[75] Inventor: Elliot J. Younessian, Lafayette, Colo.

[73] Assignee: Samsonite Corporation, Denver, Colo.

[21] Appl. No.: 23,731

[22] Filed: Feb. 26, 1993

Related U.S. Application Data

[63] Continuation of Ser. No. 598,496, Oct. 16, 1990, abandoned.

[51] Int. Cl.⁵ .................. B29C 47/00; B29C 67/14
[52] U.S. Cl. .................. 264/148; 156/221; 156/244.19; 156/244.27; 264/163; 264/171; 264/257; 264/258; 264/324; 264/325
[58] Field of Search ............ 156/221, 244.18, 244.19, 156/244.24, 244.26, 244.27, 93, 309.6, 306.9, 201, 242; 264/177.2, 210.8, 211.12, 211.14, 257, 258, 324, 325, 135, 148, 163, 171

[56] References Cited

U.S. PATENT DOCUMENTS

| | | | |
|---|---|---|---|
| Re. 25,200 | 7/1962 | Robinson et al. | 156/244.27 |
| 198,119 | 11/1834 | Wait | 425/453 |
| 482,114 | 11/1889 | Radvan et al. | 280/68 |
| 1,669,266 | 5/1928 | Stevens | 264/258 |
| 2,239,860 | 4/1941 | Roos | 264/257 |
| 2,444,420 | 7/1948 | Borkland | 264/292 |
| 2,714,571 | 8/1955 | Irion et al. | 156/244.27 |
| 2,897,109 | 7/1959 | Voigtman | 156/244.27 |
| 2,912,080 | 11/1959 | Ikelheimer | 190/53 |
| 2,994,940 | 8/1961 | Ferrell et al. | 264/257 |
| 3,058,863 | 10/1962 | Gaines et al. | 156/244.27 |
| 3,150,416 | 9/1964 | Such et al. | 264/154 |
| 3,488,413 | 1/1970 | Watts | 425/398 |
| 3,532,779 | 10/1970 | Wienand | 264/257 |
| 3,544,418 | 12/1970 | Holtzman | 156/242 |
| 3,553,822 | 1/1971 | Bergh et al. | 29/445 |
| 3,765,998 | 10/1973 | Oswald et al. | 156/244.18 |
| 3,785,900 | 1/1974 | Gras | 264/257 |
| 3,800,682 | 4/1974 | Gournelle | 425/384 |
| 3,881,978 | 5/1975 | Livingston et al. | 264/136 |
| 3,957,940 | 5/1976 | Schubert et al. | 156/244.11 |
| 4,109,543 | 8/1978 | Foti | 156/137 |
| 4,158,646 | 6/1979 | Benkowski | 264/257 |
| 4,238,266 | 12/1980 | Steinberg et al. | 156/244.27 |
| 4,292,106 | 9/1981 | Herschdorfer | 156/244.24 |
| 4,390,489 | 6/1983 | Segal | 264/322 |
| 4,440,702 | 4/1984 | Susnjara | 264/322 |
| 4,445,951 | 5/1984 | Lind et al. | 156/93 |
| 4,469,543 | 9/1984 | Segal | 156/324 |
| 4,590,027 | 5/1986 | Murphy et al. | 264/135 |
| 4,674,972 | 6/1987 | Wagner | 264/292 |
| 4,836,764 | 6/1989 | Parkinson | 264/322 |
| 4,882,114 | 11/1989 | Radvan | 264/257 |
| 4,925,512 | 5/1990 | Briand | 264/148 |
| 5,065,847 | 11/1991 | Hsieh | 190/125 |
| 5,132,166 | 7/1992 | Adams | 428/212 |

FOREIGN PATENT DOCUMENTS

| | | |
|---|---|---|
| 0109505 | 5/1984 | European Pat. Off. . |
| 0305207 | 1/1989 | European Pat. Off. . |
| 1376302 | 12/1962 | France . |
| 254333 | 12/1986 | Japan . |
| 2002282 | 2/1979 | United Kingdom . |

OTHER PUBLICATIONS

Kotte, Mitscherling, et al.; Faserverbundwerkstoffe; Gummi, Fasern, Kunstoffe; 43(1990) Jul., No. 7, Stuttgart, Germany.

*Primary Examiner*—Jay H. Woo
*Assistant Examiner*—Robert B. Davis
*Attorney, Agent, or Firm*—Gregory O'Connor

[57] ABSTRACT

The inventive process forms a thermoformable preform by pressure laminating a layer of cloth fabric to one face of the thermoplastic substrate, preferably as the substrate is extruded and while still hot from the extrusion process. This fabric/thermoplastic laminated preform can be easily processed in a matched mold press. The fabric should be of a non-stretch type. This non-stretch characteristic, together with its intimate bonding to the thermoplastic substrate, prevents the substrate from thinning in the corner regions. Indeed, because the intimately bonded fabric drags or pulls the substrate from a number of directions as the corner regions are formed, the thermoplastic substrate accumulates and actually thickens in the corner regions, leading to a shell which is remarkably durable and aesthetically pleasing.

15 Claims, 4 Drawing Sheets

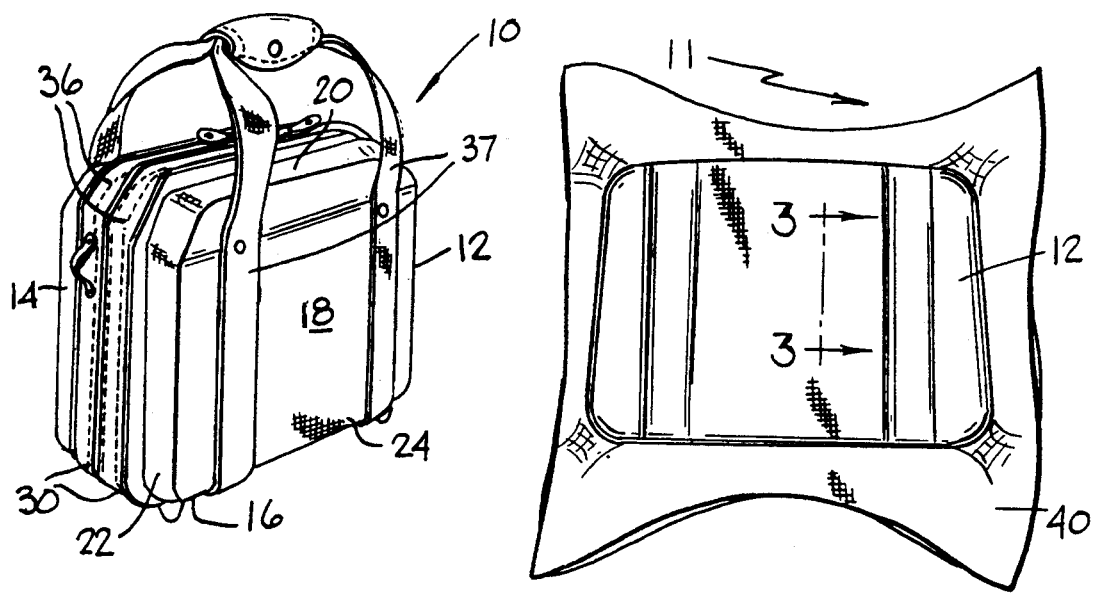
FIG.1
FIG.2
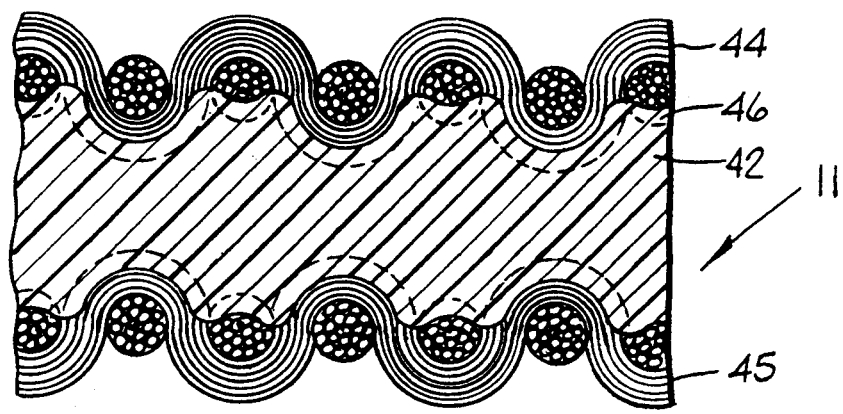
FIG.4
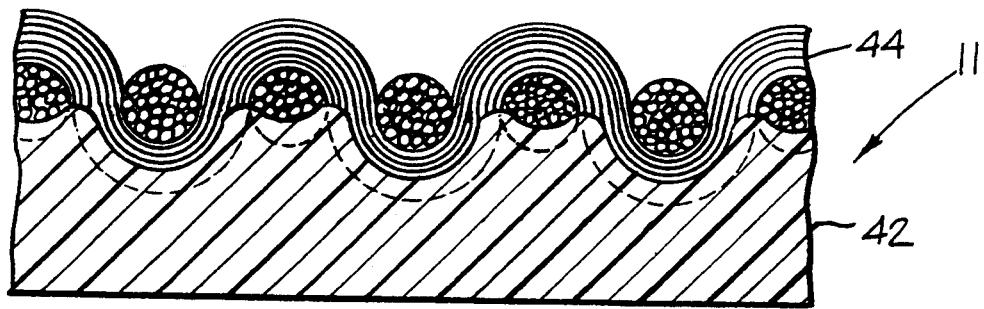
FIG.3

PROCESS FOR MAKING A THERMOFORMED SHELL FOR A LUGGAGE CASE

This is a continuation of copending application Ser. No. 07/598,496 filed on Oct. 16, 1990 now abandoned.

BACKGROUND OF THE DISCLOSURE

Over the past 20 years or so, standard hardsided luggage cases included two vacuum formed shells of a thermoplastic sheet, usually an ABS (acrylonitrile butidiene styrene) polymer. These shells were usually fastened to a pair of aluminum or magnesium frames. Accessories such as wheels and handles were also attached to the frame or directly to the shells. A drawback of such ABS shell luggage was that the corner portions, that is the areas of the generally rectangular shells at the intersection of the generally planar major face and two of the other faces, tended to be relatively thin in comparison to the other portions of the thermoformed shell. This is because, inherent to the vacuum forming process, the material is stretched thin in these corner regions during the deflection of the heated, rubbery ABS sheet into the female vacuum form. Consequently, the preform sheet tended to be made of a heavier material in order to anticipate this thinning and to compensate for the thinning so that the corner regions were adequately constructed. Despite these precautions, the vacuum formed shells are subject to failure in the corner regions since a luggage case tends to take considerable abuse concentrated at the corners.

Also as a result of making luggage of a relatively thicker ABS material, the weight of the overall luggage case tended to be high, since the thickness of the ABS material in the central portion of the shells were thicker than really necessary to provide adequate strength.

Also, considerable effort has been expended to provide a scuff resistant surface to the outside of the thermoformed shells. A printed capsheet of an especially abrasion-resistant material is normally laminated onto the thermoplastic ABS substrate.

The superior durability and scuff resistance of a fabric covered shell has been well known. In an attempt to capitalize on this phenomenon, ABS shell luggage has been covered with fabric. One such product, marketed under the trademark SILHOUETTE SUPRA by SAMSONITE CORPORATION, the assignee of the subject invention, consisted of a conventional thermoformed shell, but without the decorative printed capsheet. To this shell was adhesively fastened a tailored covering of fabric consisting of a fabric rail portion (sized to cover the periphery side walls of the shell), which is in turn sewn to a large panel of fabric for covering the major face of the shell. While the aesthetic desirability of the resulting fabric covered shell was apparent, this product was expensive to manufacture and was quite heavy. The manual operations involved in sewing the fabric covering, coating the outside of the thermoformed shell with adhesive and pulling the thus sewn covering over the ABS shell took considerable time and effort. While the scuff resistance inherent in the fabric covering helped increase one aspect of the durability of the luggage, the vulnerability of the shells to crack in the corner regions on extreme impact remained unresolved.

OBJECTS OF THE INVENTION

Accordingly, it is an object of the subject invention to provide a process whereby the superior aesthetics and scuff resistance of a fabric covering is imparted to a thermoformed shape, such as a shell for a luggage case, without the considerable time and expense involved in prior fabric covered shell systems.

It is another object of the invention to provide a method of forming a thermoplastic preform with a fabric covering which successfully overcomes the vulnerability to mechanical failure in the corner regions of a luggage shell brought on by the inherent thinning in the corner regions in a conventional vacuum formed process.

It is another object of the invention to permit the use of durable non-stretch, woven fabrics for covering thermoformed shells for luggage.

Other objects and advantages of the invention will appear from the following description in conjunction with the accompanying drawings.

BRIEF DESCRIPTION OF THE INVENTION

Accordingly, a process is provided for thermoforming a three dimensional shade, such as a shell for a luggage case, from a relatively flat preform comprising the steps of extruding a thermoplastic substrate, supplying a first fabric covering material and bonding this fabric covering material to a first face of the substrate to form a fabric covered preform. This preform is fed into a press having matching male and female mold members or tools. The preform is formed in the press while the thermoplastic substrate is in a semi-molten condition to form a shell shape which then is permitted to cool. The shell shape is trimmed to form a shell for a luggage case.

The fabric covering material and the thermoplastic preform are bonded by feeding thermoplastic substrate through a nip between a pair of rollers while still hot from the step of extruding the thermoplastic substrate, while simultaneously feeding the fabric covering material through the nip of the rollers together with the thermoplastic and pressing the thermoplastic and fabric together so that the fabric and the thermoplastic substrate are intimately bonded together.

The preferred fabric covering material is capable of stretching no more than about 15% at any step in the disclosed process. This fabric covering material is a tightly woven material with or without a bond enhancing coating such as an acrylic polymer latex. The male and female molds or tools are sized to provide a space between them, when the press has closed onto the thermoplastic fabric coated preform, which has a thickness about the same dimension as the thickness of the laminated preform.

Also disclosed is a luggage case, including at least one thermoformed shell having a major face, a side face, a top face, and at least one corner region at the intersection of these faces. This shell comprises a thermoplastic substrate to at least one major face of which has been intimately bonded a fabric covering prior to thermoforming that corner region. The fabric covering is substantially continuous over the entire major face of the thermoplastic substrate and is formed of one integral piece and co-extensive over at least the corner region. The fabric covering is made of a woven non-stretch type fabric and is bonded intimately to the substrate at the thermoforming temperatures, whereby the bonded fabric prevents the thermoplastic substrate from becoming thin in the corner region.

BRIEF DESCRIPTION OF THE FIGURES

FIG. 1 shows a luggage case, in particular a camera bag, which includes shells formed in accordance with the instant inventive process.

FIG. 2 shows a thermoformed shell preform made in accordance with the disclosed inventive process.

FIG. 3 is a typical cross section taken along 3—3 of FIG. 2.

FIG. 4 shows an alternate construction to that shown in FIG. 3.

DETAILED DESCRIPTION OF THE PREFERRED EMBODIMENT

Figure 5:
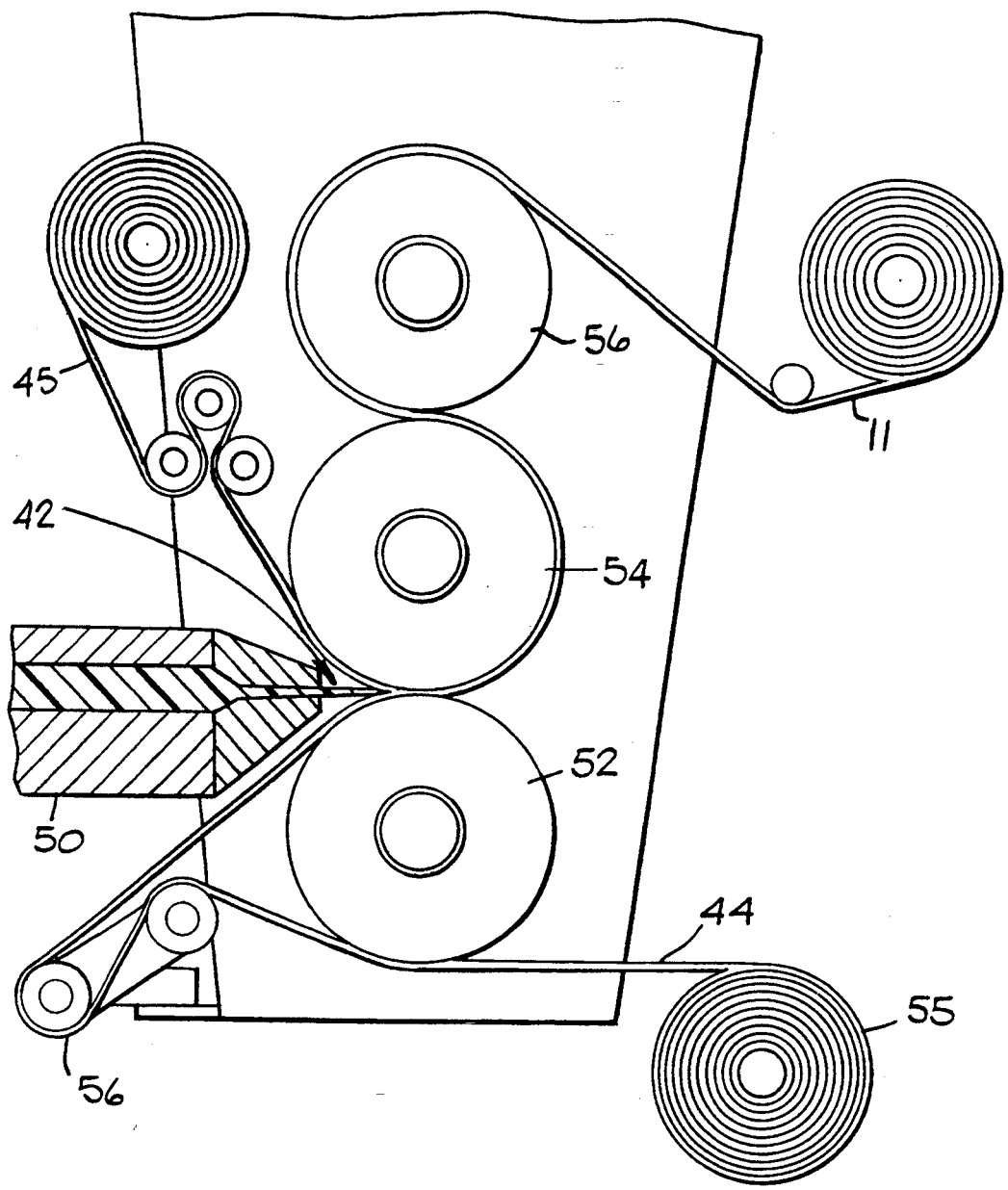
FIG. 5 shows the operation for bonding fabric and the thermoplastic substrate.

Referring to FIG. 1, a luggage case 10 employing two shells 12 and 14 made by the subject process is shown. The shells include corner regions such as region 16. These corner regions are characterized by the intersection of the major face 18 and top face 20 or bottom face 24 and side faces 22. The shell 14 has similar corner regions. Since most luggage cases are generally parallelepiped in shape, there would be four such corner regions for each of the shells 12 and 14. In any event, the outside of each of the shells is covered with a fabric covering material 24, as will be detailed later. Generally though the fabric covering 24 provides superior aesthetics and durability to the case. The fabric covering 24 is essentially seamless, that is made of one piece, and is continuous throughout the outside surface of the shell, and in particular in the corner regions such as region 16. Other details of the luggage case 10 include a pair of extruded vinyl frames 30 and 30 which are fastened to the outer peripheral edge of each of the shells 12 and 14 with ordinary stitch lines 36 formed by an industrial type sewing machine, as can be seen continuing around the periphery of the case. The two shells are hinged together at a bottom hinge (not shown) and are selectively openable using a conventional zipper-type closure (also not shown). The case 10 further includes straps 37 riveted onto each shell into vertical indentations molded into the outer surface of each shell.

Figure 8:
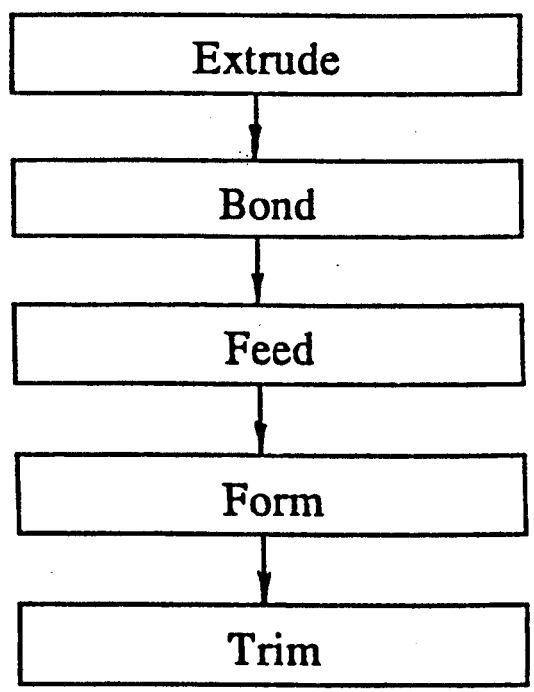
FIG. 8 illustrates the claimed process.

FIG. 2 shows the shell 12 in an early stage (preform 11) of its formation. In particular, as will be referred to throughout this disclosure, this particular intermediate stage of shell is called a formed shell preform, since it includes a fringe or edge 40 of thermoplastic substrate and fabric covering. This edge 40 will be trimmed off in a subsequent step (see FIG. 8), resulting in a shell 12 ready for riveting and sewing to various other components to form the luggage case 10.

FIG. 3 and FIG. 4 show extremely enlarged cross sectional views of the fabric covered thermoplastic substrate from which shell 12 and its preform 11 are made. The heart of this material is the thermoplastic substrate 42. Conventional luggage related thermoplastic can be used to form the substrate 42. The same ABS thermoplastic alloy used in prior hardsided luggage can be used. Of course, since at least the outside surface of the luggage will usually be covered by the fabric, no separately applied printed or engraved ABS capsheet is necessary. Thus, the substrate 42 can include regrind and other materials and be of almost any color, especially if the inside surface of the luggage shell is also covered with a fabric. Note the fabric 44 is a woven fabric of a very tight weave. Unlike other fabric covered shell systems, fabric 44 need not, and as will become apparent, should not be of the stretch-type fabric. In fact, fabric 44 should resist stretching, not only along the warp and woof directions, but also in the bias direction.

The interface 46 between the fabric 44 and the substrate 42 is characterized by an intimate mechanical or chemical bond between the fabric 44 and the substrate 42. As will be detailed later, this mechanical or chemical adhesive bond is accomplished by a combination of heat and pressure.

FIG. 4 is identical to FIG. 3, except the substrate 42 is covered on both its major faces by the fabric covering material. To derive full benefits of this invention, at least one of the fabric covering materials 44 and 45 must have the non-stretch characteristics detailed herein, and also remain intimately bonded to the substrate 42, even at the processing temperatures involved in the thermoforming process. Thus, only one of the fabric covering materials is needed to control the movement of the substrate during thermoforming, which phenomenon is characteristic of the inventive process. The second fabric covering provides a convenient, relatively wrinkle free lining for a luggage shell compared to a conventional postforming, manually applied lining.

The intimate bond characterized in FIGS. 3 and 4 is obtained in accordance with the instant invention by directly extruding the continuous web of the thermoplastic substrate onto a surface of the fabric. FIG. 5 illustrates this wherein conventional sheet extruding die lips 50 extrude a sheet of molten thermal plastic into the nip of rollers 52 and 54. A feed roll 55 of fabric covering material 44 pays out a continuous ribbon of fabric over dancing rollers 56 which continually adjust the tension on the ribbon of fabric 44 so that it is smoothly fed to the nip between the rollers 52 and 54 with a minimum, or at least a controlled, amount of tension thereon. A feed roll of fabric 45 is also shown being fed into the nip between rollers 52 and 54. Again, the use of two layers of fabric, one on the top and one on the bottom of the thermoplastic material, is not necessary to practice the subject invention, as will be set forth in greater detail. In any event, the layer or layers of fabric are fed to the nip roll on either side of the layer of molten thermoplastic substrate 42. The combination of heat and pressure is localized along the full width of the ribbon of thermoplastic substrate 42, forcing the thermoplastic into the interstices in the surface of the fabric so that a strong mechanical bond is provided.

Because of the nature of this bond, the fabric itself must have special surface characteristics in order to receive this mechanical or chemical adhesive bond, yet prevent the molten thermoplastic from leaking or "striking through" during this step in the process, as well as during the subsequent thermoforming of the shells. In particular, it has been found desirable to use a very tight basket weave polyester material onto one major face of which has been coated a foamed acrylic copolymer waterproofing coating. The acrylic copolymer is preferably brushed into the surface to enhance the bond between this acrylic latex and the fabric itself. This is a conventional fabric normally used for softside luggage and upholstery applications, with the acrylic coating being normally provided to enhance the resistance of the fabric to water and dust penetration. Here, however, this acrylic copolymer latex coating provides two functions. The first is to prevent the thermoplastic from striking through the small but numerous gaps between the warp and woof threads of the tight basket weave fabric. Secondly, it enhances the otherwise difficult adhesive bond between the acrylic fibers making up the fabric covering material and the thermoplastic, especially if that thermoplastic substrate is a polypropylene extruded sheet. While FIG. 5 shows both top fabric covering material 44 and bottom covering fabric material 45, the construction of FIG. 3 can easily be had by eliminating the feed of fabric 45 into the nip of rollers 52 and 54.

The thus formed two (or three) layer laminate or preform 11 is cooled around roller 54. Then a reverse roll 56 bends the laminate around a reverse circumference as the preform web continues to cool. Subsequently, the supply roll is formed of the laminate for subsequent use, as will be detailed.

Figure 6:
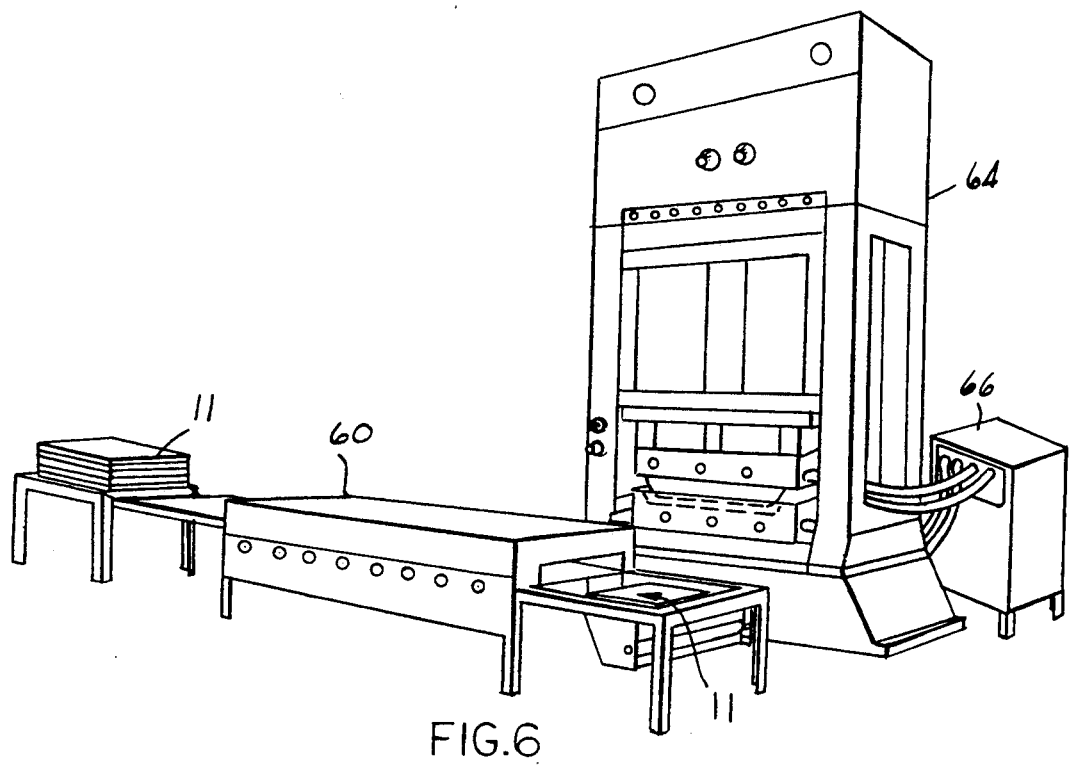
FIG. 6 shows the apparatus for molding a shell.

Turning to FIG. 6, the preferred method of using the thus formed laminate is shown. To the right is shown a supply of fabric covered preforms 11. While not necessary to the process, it is found desirable to cut the continuous web of thermoplastic and fabric laminate into a series of preforms 11 of predetermined size. This permits easy handling of the preform and reduces the risks inherent in a continuous in-line process, although such a continuous in-line process is contemplated by the instant invention. In any event, individual preforms 11 are fed into an infrared oven 60 onto a moving wire conveyor which passes between oppositely facing infrared heaters (not shown). A predetermined time later, the heated preform 11 emerges on the other end of the oven. In this condition, the thermoplastic substrate is in a semi-molten or plastic condition. This condition is characterized by a generally rubbery, flaccid condition for an ABS sheet or, in the case of a polypropylene sheet, a flaccid, taffy-like consistency. The operator takes the thus heated, semi-molten thermoplastic laminate and places it between the jaws of a press 64. The press is hydraulically controlled and includes a hydraulic pressure control system 66 of conventional construction. This system can be adjusted and calibrated so that the jaws of the press will apply a predetermined amount of pressure for a predetermined duration to the preform as it is thermoplastically deformed by the tools carried by the jaws of the press.

Figure 7A:
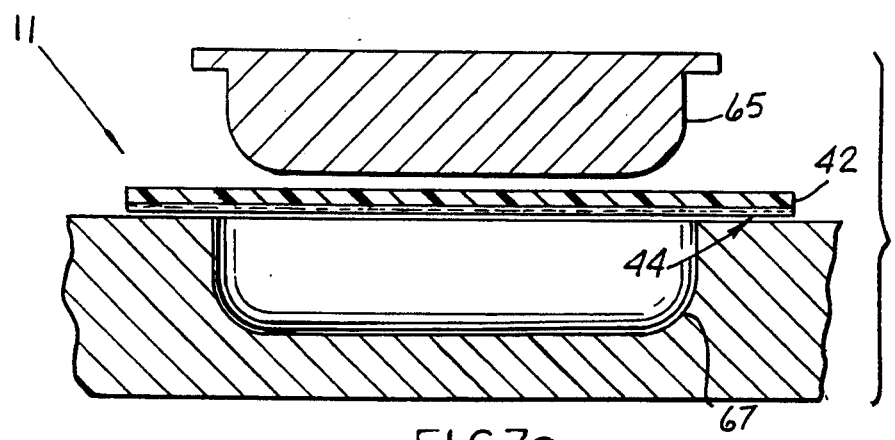
FIG. 7a and FIG. 7b illustrate steps in the process of forming the inventive shell.
Figure 7B:
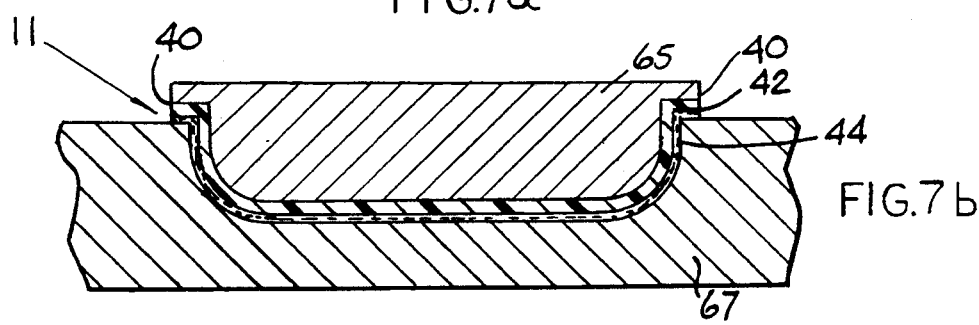

FIG. 7a and 7b shows in schematic fashion that those tools comprise a male mold 65 and a female mold 67. The male mold 65 is dimensioned so that, when the jaws of the press 64 are fully deployed and the hydraulic pressure controller 66 has applied the maximum predetermined pressure, the gap between male mold 65 and female mold 67 approximately equals the original thickness of the preform 11. As will become apparent, this invention contemplates deviating from this general rule for specific areas and purposes, in particular in the areas of the gap between the mold portions which correspond to the corner regions of the finished molded preform. In any event, the preform 11 is merely placed over the female mold 67 and the press cycled to bring the male mold 65 into final position as in FIG. 7b. Unlike conventional vacuum forming, no attempt is made to constrain the movement of the edges of the preform 11 as the male mold 65 forces the preform into the female mold 67. This is an important aspect of the subject invention, since it is the substantially non-stretching fabric covering 44 (and/or covering 45) which operates to move and distribute the plastically flowing substrate 42 into its ultimate shape. Thus, fabric 44 must remain substantially unrestrained for most of the actual molding process. Only as the press jaws close onto the edge portions 40 of the preform 11 is there any substantial restraining of the movement of the fabric. At that point in the forming process, most of the movement of the preform is complete anyway.

FIG. 7b shows in schematic fashion the mold portion 65 and 67 at the completion of the molding stroke provided by press 64. The end portions of the preform 11 have been pulled inwardly substantially and the gap, as detailed above, is substantially filled by the laminate preform 11. While not shown, tool members 65 and 67 are cooled by a fluid so that on withdrawal of the male mold 65, the preform 11 retains the final shape of the luggage shell.

EXAMPLE 1

An example of the inventive process comprises forming of the shell 12 for the camera case. The substrate 42 consists of a conventional polypropylene compound extruded in a conventional manner into the nip rolls as shown in FIG. 5. Its overall thickness was about 0.085 inches. The fabric 44 is a coated basket weave fabric which can be characterized as a non-stretch fabric. For example, this fabric stretches less than about 15% under 5 lbs. tension when being laminated to the polypropylene substrate.

The press 64 is hydraulically operated and the pressure regulated so that the pressure is controlled between 50 and 100 p.s.i. This pressure permits the details (such as the indentations for the handle straps) of the finished product shape (as provided in the surface of the male and female mold) to be coined into the surface of the hot laminate material. Yet the pressure is not so high to push the substrate through the interstices of the woven cloth. The male and female molds are sized to leave a gap which approximately corresponds of the initial thickness (+50%/−10%) of the cloth/substrate preform 11. In a particular example, the polypropylene substrate has a nominal thickness of about 0.085 inches, and a woven cloth fabric has a nominal thickness of about 0.017 inches. The combined lamination (after some loss resulting from pressing the cloth into the surface of the substrate) is about 0.100 inches thick. The matched mold tools for the camera case of FIG. 1 have an overall depth of about 3 inches, with the male portion of the mold fitting to within 0.100 inches of the female portion of the cavity. In some areas (i.e., the corners where a buildup of substrate material is desired) this matched male and female tooling forms a gap of about 0.130 inches.

The fabric material is of a type which resists stretching at the process temperatures, such that the overall elongation of the fabric in both the warp and woof direction is less than about 10%, preferably less than about 5%. Thus, when such fabric is intimately bonded to the thermoplastic substrate in accordance with the lamination process set forth above, the fabric can be depended upon to carry with it the thermoplastic substrate during the processing.

This is especially noticeable and desirable at or near the corner regions of the luggage shell. Here, the edges 40 of the heated preform which will eventually become scrap is permitted to move or slide as the substrate/- cloth laminate is pulled into the female mold by the male portion of the mold. In this process, the fabric, being firmly adhered to this substrate, carries with it the viscous substrate from several directions surrounding each corner. This action contributes a substantial volume of substrate material, actually thickening the substrate in the corners in contrast to the normal thinning which occurs in the conventional vacuum-formed processing of luggage shells. This fabric "feeding" of the substrate is best utilized when adequate material projects beyond the edges of the matched mold halves when the mold is closed. For example, for a shell having a major longitudinal dimension of about 12 inches and depth of about 3 inches, it has been found desirable to dimension the preform 11 such that about a half an inch of fabric projects beyond the edge of the mold shape.

To further illustrate the limited stretch characteristics of the preferred embodiment, the molded shell preform 11 in the above example had the following physical characteristics. The overall stretch in the horizontal dimension amounted to only about 2% between the premolded preform (flat sheet) and molded shell preform 11 as shown in FIG. 2. The stretch in the other direction was about the same. The stretch in the diagonal direction amounted to about 5.2% (corner to corner in the overall preform 11). Measuring along the diagonal defined by the corner regions of the shell shape, the overall stretch was only 8.1%. This is in striking contrast to a conventional vacuum formed shell in which, if equivalent measurements were done, the stretch during molding can be 50% and sometimes 80%.

The particular fabric used was an 1800 denier polyester. Comparing the pics per inch of the preform 11 in the center of the major face 24 of the shell shape with the corresponding measure in the corner regions, it was found that the cloth had been foreshortened such that the pics per inch increased between about 5% and about 30%. Comparing the pics per inch in the preform prior to thermoforming with the fabric covering in these same corner regions shows a similar 5% to 30% foreshortening.

Not only does this foreshortening or compression illustrate the intimate bond/substrate feeding phenomenon, the vulnerable corner regions are provided with a denser, more tightly woven fabric covering. This denser covering not only decreases the likelihood of substrate strike through during thermoforming, but also provides a more abrasion and wear resistant corner region in the finished product.

The shells, according to the instant invention, are remarkably free of wrinkles, having wrinkles only near the intersection of the edge portions 40 with the shell shape.

Ideally the temperature for the laminate, just prior to molding, should be high enough to make the combination pliable such that the material will conform to the matched mold tooling at the 50-100 p.s.i. process pressures set forth above. For an ABS substrate, this temperature is between 250 degrees Fahrenheit and 350 degrees Fahrenheit. For other materials, especially crystalline thermoplastic materials, this temperature should be above the glass transition temperature for the material. The upper limit of such processing temperatures is determined solely by the degradation characteristics of the cloth, the substrate and any adhesion promoting material at the cloth/substrate interface.

EXAMPLE 2

When applied to a finished luggage case and compared with a conventional ABS shell material, the luggage shells formed of the inventive material have superior physical characteristics. For example, a standard case was made up using a standard construction, except for the disclosed use of the inventive shell material. The shell material comprised a thermoplastic ABS substrate having a nominal thickness of only 0.085 inches to which was laminated, according to the disclosed process, a coated basket weave fabric described above. The fabric contributed between 0.010 and 0.015 inches of additional thickness, bringing the total to having a dimension of 0.100 inches. A luggage case was submitted to a battery of standard performance tests which investigated resistance to permanent deformation on impact, overall physical integrity and dimensional stability. In one test (called a tumble test), for example, the finished case was filled with a load of simulated clothing and placed in a rotating drum where the case was permitted to tumble against wooden and metal obstructions with sharp corners fixed to the interior circumference of the drum. The case made of the inventive material maintained physical integrity long after a conventional case would have failed. The corners of the case appeared to have the original shape and were intact. A conventional case made of similar ABS material but with a decorative capsheet having a total thickness of 0.1200 inches, after undergoing a similar test, had corners dented or dimpled and, in one case, a corner was completely punched out.

The case with the inventive laminate was subsequently disassembled. The ABS substrate had itself yielded, splitting in several places. But the intimate bond of the fabric had retained the overall shape of the case and had held the broken portions together. Thus the physical integrity of the case was maintained. The superior mechanical characteristics of the material results in a substantial weight savings over conventional construction. For example, in a typical standard case size, the case using the inventive laminated shells saved 6 ounces in overall weight.

I claim:

1. A process of thermoforming a cloth covered shape from a preform, said shape having a three dimensional contour including a corner region, comprising the steps of:
   a. extruding a thermoplastic substrate;
   b. supplying a first woven cloth covering material;
   c. bonding the woven cloth covering material to a first face of said substrate to form a preform having a woven cloth covered exposed face and a substantially continuous thermoplastic layer on the other exposed face;
   d. feeding the preform into a press having matched male and female tools;
   e. forming the preform in the press while the substrate is in a semi-molten condition to form said corner region.

2. A process of thermoforming a shape as in claim 1 further including the step of:
   a. cooling the cloth covered shape after the step of forming.

3. A process of thermoforming a shape as in claim 2 further including the step of:
   a. trimming the cloth covered shape after the step of cooling.

4. A process of thermoforming a shape as in claim 1 further including the steps of:
   a. supplying a second covering material comprising a fabric layer; and
   b. bonding said second covering material to a second face of said substrate.

5. A process of thermoforming a shape as in claim 1 further including the step of:
   a. cutting the cloth covered preform into a series of individual preforms before the step of feeding.

6. A process of thermoforming a shape as in claim 1 further including the steps of:
   a. cooling the cloth covered preform to ambient temperature; and
   b. heating the cloth covered preform to place the thermoplastic substrate of the preform in a semi-molten condition before the step of feeding the press.

7. A process of forming a shape as in claim 1 wherein the step of bonding comprises:
   a. feeding the thermoplastic substrate through the nip between a pair of rollers while still hot from the step of extruding; and
   b. feeding the cloth covering material through the nip of said pair of rollers together with the thermoplastic; and
   c. squeezing the cloth covering material and the thermoplastic substrate together at the nip;
   d. whereby the cloth covering material and the thermoplastic are intimately bonded together.

8. A process of forming a shape as in claim 1 wherein:
   a. the cloth covering material is a non-stretch woven fabric capable of stretching no more than about 25 percent at the temperature at which the fabric covered preform is pressed into the shape.

9. A process of forming a shape as in claim 1 wherein:
   a. the cloth covering material is a non-stretch woven fabric capable of stretching no more than about 15 percent at the temperature at which the fabric covered preform is pressed into the cloth covered shape.

10. A process of forming a shape as in claim 1 wherein:
    a. said cloth covering material is a basket weave cloth.

11. A process of forming a shape as in claim 9 wherein:
    a. the cloth covering material has a tightly woven basket weave with a bond enhancing coating thereon.

12. A process of forming a shape as in claim 1 wherein:
    a. the male and female molds are so dimensioned so as to provide, a space therebetween, when the press has closed onto the preform during the step of pressing, which space has a thickness dimension approximately equal to the thickness dimension of the preform.

13. A process of forming a shape as in claim 1 wherein:
    a. the said woven cloth covering material comprises a cloth capable of intimately bonding to said substrate such that, when said substrate is in a semi-molten condition, said fabric remains adhered to said substrate; and
    b. wherein said step of forming includes the step of carrying said substrate into said mold on said woven cloth material covering whereby the thickness of said substrate remains substantially unreduced as a result of the step of molding.

14. A process of forming a shape as in claim 1 wherein:
    a. said thermoplastic substrate is polypropylene.

15. A process of forming a shape as in claim 1 wherein:
    a. said thermoplastic substrate is ABS.

* * * * *